(12) United States Patent
Kim et al.

(10) Patent No.: US 10,488,935 B2
(45) Date of Patent: Nov. 26, 2019

(54) TOUCH SENSITIVE ELEMENT AND DISPLAY DEVICE INCLUDING THE SAME

(71) Applicant: LG Display Co., Ltd., Seoul (KR)

(72) Inventors: TaeHeon Kim, Seoul (KR); SuSeok Choi, Seongnam-si (KR); YongSu Ham, Seoul (KR); YongWoo Lee, Goyang-si (KR); KyungYeol Ryu, Goyang-si (KR); YuSeon Kho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/430,241

(22) Filed: Jun. 3, 2019

(65) Prior Publication Data
US 2019/0286240 A1  Sep. 19, 2019

Related U.S. Application Data

(63) Continuation of application No. 15/820,055, filed on Nov. 21, 2017, now Pat. No. 10,353,472.

(30) Foreign Application Priority Data

Nov. 29, 2016 (KR) ........................ 10-2016-0160107

(51) Int. Cl.
*G06F 3/01* (2006.01)
*G06F 3/041* (2006.01)
*G06F 3/044* (2006.01)

(52) U.S. Cl.
CPC .............. *G06F 3/016* (2013.01); *G06F 3/041* (2013.01); *G06F 3/044* (2013.01); *G06F 2203/04111* (2013.01); *G06F 2203/04112* (2013.01)

(58) Field of Classification Search
CPC ....... G06F 3/016; G06F 2203/013–015; G06F 3/04812; G06F 3/011; G06F 3/0414
See application file for complete search history.

(56) References Cited

U.S. PATENT DOCUMENTS

| | | |
|---|---|---|
| 9,411,378 B1 * | 8/2016 | Knepper ............... G06F 1/1652 |
| 2010/0026473 A1 | 2/2010 | Prein |
| 2012/0128960 A1 | 5/2012 | Büsgen et al. |
| 2013/0002584 A1 | 1/2013 | Leem et al. |
| 2014/0098075 A1 | 4/2014 | Kwak et al. |

(Continued)

FOREIGN PATENT DOCUMENTS

| | | |
|---|---|---|
| KR | 10-2015-0112793 A | 10/2015 |
| KR | 10-2016-0080955 A | 7/2016 |
| WO | WO 2015/061498 A1 | 4/2015 |

OTHER PUBLICATIONS

European Search Report for European Patent Application No. EP 17202766.6, dated Apr. 6, 2018, 7 Pages.

(Continued)

*Primary Examiner* — Sanghyuk Park
(74) *Attorney, Agent, or Firm* — Fenwick & West LLP

(57) ABSTRACT

The touch sensitive element according to an exemplary embodiment of the present disclosure includes an electroactive layer, an electrode, and a plurality of beads. The electroactive layer includes an electroactive polymer. The electrode is disposed on at least one surface of the electroactive layer. The plurality of beads is dispersed in the electroactive layer and has a diameter larger than the thickness of the electroactive layer.

19 Claims, 10 Drawing Sheets

(56) References Cited

U.S. PATENT DOCUMENTS

2016/0253041 A1    9/2016   Park et al.
2017/0357325 A1   12/2017   Yang et al.

OTHER PUBLICATIONS

Memsnet, "Material: PVDF-TrFE (Copolymer of vinylidene fluoride &trifluoroethylene), film," date unknown, one page, [Online] [Retrieved on Nov. 10, 2018] Retrieved from the Internet <URL: https://www.memsnet.org/material/pvdftrfecopolymerofvinylidenefluoridetrifluoroethylenefilm>.

Memsnet, "Material: Silicon (Si), bulk," date unknown, five pages, [Online] [Retrieved on Nov. 10, 2018] Retrieved from the Internet <URL: https://www.memsnet.org/material/siliconsibulk/>.

United States Office Action, U.S. Appl. No. 15/820,055, dated Nov. 16, 2018, 16 pages.

\* cited by examiner

TOUCH SENSITIVE ELEMENT AND DISPLAY DEVICE INCLUDING THE SAME

CROSS-REFERENCE TO RELATED APPLICATIONS

This application is a continuation of U.S. patent application Ser. No. 15/820,055 filed on Nov. 21, 2017, which claims the priority of Republic of Korea Patent Application No. 10-2016-0160107 filed on Nov. 29, 2016, in the Korean Intellectual Property Office, the disclosures all of which are each incorporated herein by reference in its entirety.

BACKGROUND

Field

The present disclosure relates to a touch sensitive element and a display device including the same, and more particularly, to a touch sensitive element with an improved vibration strength and a display device including the same.

Description of the Related Art

A touch element is a device which senses a user's touch input such as screen touch to a display device or a gesture and is widely utilized for display devices of a public facilities and a large size display device such as a smart TV, in addition to a portable display device such as a smart phone or a tablet PC. An operation type of the touch element may include a resistive type, a capacitive type, an optical type, and electromagnetic (EM) type.

However, recently, in addition to sensing of the user's touch input, studies on a haptic device which transmits a tactile feedback sensed by a finger of the user or a stylus pen of the user as a feedback for the user's touch input are being performed.

Such a haptic device, a haptic device to which an eccentric rotating mass (ERM) is applied, a haptic device to which a linear resonant actuator (LRA) is applied, and a haptic device to which a piezo ceramic actuator is applied are used. However, the above-mentioned haptic devices are configured by an opaque material and do not vibrate a specific part of the display device, but rather vibrate the entire display device. Further, the above-mentioned haptic devices do not provide various vibration feelings and easily break due to an external impact because of low durability of the haptic devices.

In order to solve the above-described problems, a haptic device which uses an electroactive polymer (EAP) is studied. Since the haptic device which uses the electroactive polymer is thin and flexible, the haptic device may be easily applied to various display devices. However, the haptic device which uses the electroactive polymer has problems in that a vibration strength is lower than the ERM, the LRA, and the piezo ceramic actuator and a driving voltage is high.

SUMMARY

An object to be achieved by the present disclosure is to provide a touch sensitive element which has an excellent vibration strength by improving a blocking force of a touch sensitive element and a display device including the same.

Further, another object to be achieved by the present disclosure is to provide a touch sensitive element which may transmit tactile feedback with an excellent vibration strength even though the touch sensitive element is disposed below the display panel and a display device including the same.

Objects of the present disclosure are not limited to the above-mentioned objects, and other objects, which are not mentioned above, can be clearly understood by those skilled in the art from the following descriptions.

According to an aspect of the present disclosure, there is provided a touch sensitive element including an electroactive layer including an electroactive polymer; a first electrode electrically coupled to a surface of the electroactive layer; a second electrode electrically coupled to a same surface or a different surface of the electroactive layer as the first electrode, the electroactive layer configured to vibrate responsive to applying a voltage difference between the second electrode and the first electrode; a plurality of beads dispersed in the electroactive layer, the plurality of beads having a diameter that is larger than a thickness of the electroactive layer. Therefore, at least one surface of the electroactive layer is formed to be convex along the surfaces of the plurality of beads and the surface area of the electroactive layer is increased. Accordingly, the blocking force of the touch sensitive element may be improved and the vibration strength of the touch sensitive element may be improved.

According to another aspect of the present disclosure, there is provided a touch sensitive element comprising: an electroactive layer including an electroactive polymer; a first electrode electrically coupled to a surface of the electroactive layer; a second electrode electrically coupled to a same surface or a different surface of the electroactive layer as the first electrode, the electroactive layer configured to vibrate responsive to applying a voltage difference between the second electrode and the first electrode; and a plurality of beads dispersed in the electroactive layer, the plurality of beads having a Young's modulus that is greater than a Young's modulus of the electroactive polymer.

According to another aspect of the present disclosure, there is provided a display device including a display panel which displays an image and a touch sensitive element below the display panel. The touch sensitive element includes: an electroactive layer; a first electrode electrically coupled to a surface of the electroactive layer; a second electrode electrically coupled to a same surface or a different surface of the electroactive layer as the first electrode, the electroactive layer configured to vibrate responsive to applying a voltage difference between the second electrode and the first electrode; and a plurality of beads dispersed in the electroactive layer, and wherein at least one surface of the electroactive layer that overlaps the plurality of beads is convex. Therefore, the surface area of the electroactive layer is increased so that the blocking force of the touch sensitive element is improved. As the blocking force of the touch sensitive element is improved, the touch sensitive element may overcome a load of the display panel disposed above and vibrate the display panel with a large force, and the vibration of the touch sensitive element may be easily transmitted to the user through the display panel.

Other detailed matters of the exemplary embodiments are included in the detailed description and the drawings.

According to the present disclosure, it is possible to increase a surface area of the electroactive layer using a plurality of beads having a diameter which is larger than a thickness of the electroactive layer and to improve a blocking force of the touch sensitive element. Therefore, the vibration strength of the touch sensitive element may be improved.

Further, according to the present disclosure, it is possible to increase an overall Young's modulus of the electroactive layer using a plurality of beads having a Young's modulus which is larger than that of the electroactive polymer which configures the electroactive layer and to improve a blocking force of the touch sensitive element. Therefore, the vibration strength of the touch sensitive element may be improved.

Further, according to the present disclosure, the blocking force of the touch sensitive element is improved so that the touch sensitive element may vibrate with a larger force. Therefore, even though the display panel is disposed above the touch sensitive element, the vibration of the touch sensitive element may be easily transmitted to the user through the display panel.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
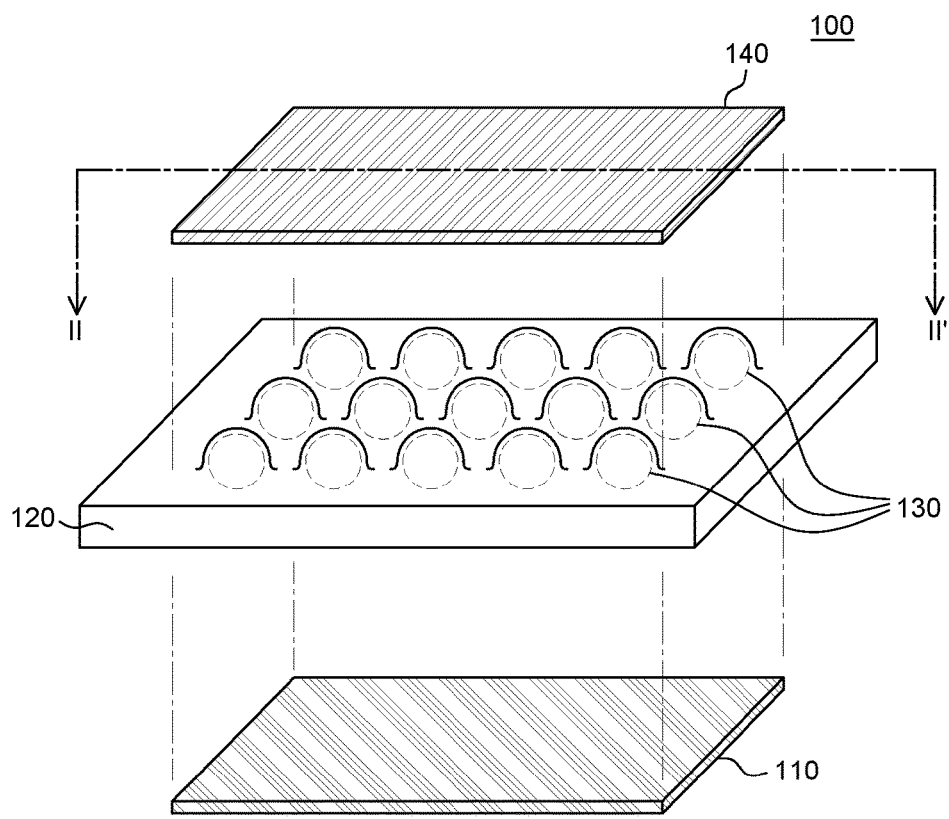
FIG. 1 is an exploded perspective view of a touch sensitive element according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Further, in the following description of the present disclosure, a detailed explanation of known related technologies may be omitted to avoid unnecessarily obscuring the subject matter of the present disclosure. The terms such as "including," "having," and "comprise of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next to", one or more parts may be positioned between the two parts unless the terms are used with the term "immediately" or "directly" is not used.

When an element or layer is disposed "on" other element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawings are illustrated for convenience of description, and the present disclosure is not limited to the size and the thickness of the component illustrated.

The features of various embodiments of the present disclosure can be partially or entirely adhered to or combined with each other and can be interlocked and operated in technically various ways as understood by those skilled in the art, and the embodiments can be carried out independently of or in association with each other.

Hereinafter, various exemplary embodiments of the present disclosure will be described in detail with reference to accompanying drawings.

Figure 2:
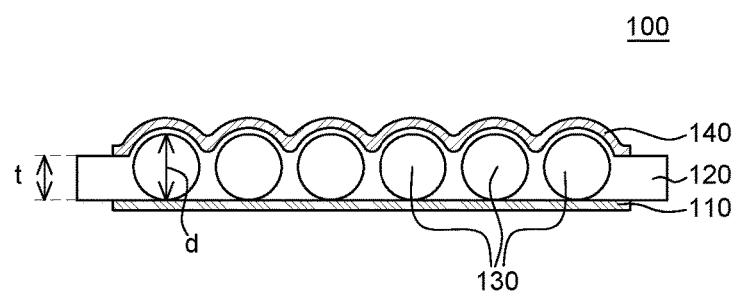
FIG. 2 is a cross-sectional view taken along the line II-II' of FIG. 1 according to an exemplary embodiment of the present disclosure.

FIG. 1 is an exploded perspective view of a touch sensitive element according to an exemplary embodiment of the present disclosure. FIG. 2 is a cross-sectional view taken along the line II-II' of FIG. 1 according to an exemplary embodiment of the present disclosure. Referring to FIGS. 1 and 2, a touch sensitive element 100 includes an electroactive layer 120, a first electrode 110, a second electrode 140, and a plurality of beads 130.

The first electrode 110 and the second electrode 140 may be disposed on at least one surface of the electroactive layer 120. For example, as illustrated in FIGS. 1 and 2, the first electrode 110 may be disposed on a lower surface of the electroactive layer 120 and the second electrode 140 may be disposed on an upper surface of the electroactive layer 120. The first electrode 110 and the second electrode 140 are electrodes which apply voltages to the electroactive layer 120 and are formed of a conductive material. Further, in order to secure light transmittance of the touch sensitive element 100, the first electrode 110 and the second electrode 140 may be formed of a transparent conductive material. For example, the first electrode 110 and the second electrode 140 may be formed of a transparent conductive material such as indium tin oxide (ITO), aluminum doped zinc oxide (AZO), fluorine tin oxide (FTO), or silver-nano wire (AgNW). Further, the first electrode 110 and the second electrode 140 may be configured by a metal mesh. That is, the first electrode 110 and the second electrode 140 are configured by a metal mesh in which a metal material is disposed in a mesh form so that the first electrode 110 and the second electrode 140 may substantially serve as transparent electrodes. However, the components of the first electrode 110 and the second electrode 140 are not limited to the above-described example, but various transparent conductive materials may be used as the components of the first electrode 110 and the second electrode 140. The first electrode 110 and the second electrode 140 may be formed of the same material or formed of different materials.

The electroactive layer 120 includes an electroactive polymer. That is, the electroactive layer 120 is a plate-shaped film formed of an electroactive polymer which is a polymer material deformed by an electrical stimulation. When an electric field is applied between the first electrode 110 and the second electrode 140, an alignment direction of dipoles in the electroactive polymer which configures the electroactive layer 120 is modified and thus the electroactive layer 120 vibrates by an electrostatic attractive force or repulsive force. The electroactive layer 120 is formed of a PVDF based polymer. For example, the electroactive layer 120 may be formed of a PVDF copolymer such as poly(vinylidene fluoride-trifluoroethylene) (PVDF-TrFE) or a PVDF terpolymer such as poly(vinylidene fluoride-trifluoroethylene-chlorofluoroethylene) (PVDF-TrFE-CFE) or poly(vinylidene fluoride-trifluoroethylene-chlorotrifluoroethylene) (PVDF-TrFE-CTFE). The PVDF copolymer and the PVDF terpolymer are ferroelectric polymers or relaxed ferroelectric polymer and have an advantage in that large vibration may be generated by a low driving voltage. Further, in the PVDF copolymer and the PVDF terpolymer, TrFE is randomly coupled to the PVDF, so that β-phase may be naturally formed by an electronegativity difference between hydrogen (H) atom and fluorine (F) atom. Therefore, differently from the PVDF homopolymer, a polling process for forming a β phase is not necessary and a manufacturing process of the touch sensitive element 100 is simplified, and a manufacturing cost is reduced. Further, since the transmittance of a film type electroactive layer 120 is excellent, the touch sensitive element 100 is attached on a front surface of the display panel to be easily applied to the display device.

A plurality of beads 130 is dispersed in the electroactive layer 120 and each of the beads 130 has a diameter d which is larger than a thickness t of the electroactive layer 120. Here, the thickness t of the electroactive layer 120 means a thickness t of the electroactive layer 120 when the electroactive layer 120 in which the beads 130 are not dispersed is formed to have a uniform thickness t. For example, as illustrated in FIGS. 1 and 2, when the beads 130 are not dispersed at an outer boundary of the electroactive layer 120, a distance between a lower surface and an upper surface of the electroactive layer 120 at the outer boundary of the electroactive layer 120 means a thickness t of the electroactive layer 120. In this case, the electroactive layer 120 has a minimum thickness t at the outer boundary of the touch sensitive element 100 on which beads 130 are not disposed and a diameter d of the bead 130 is larger than a minimum thickness t of the electroactive layer 120. Further, a diameter d of the bead 130 means the largest length among cross-sectional lengths of the bead 130. Even though in FIGS. 1 and 2, a spherical bead 130 is illustrated, a shape of the bead 130 may not be perfectly spherical, but may be elliptical or polyhedral. The diameter d of the bead 130 means the largest length among cross-sectional lengths of the bead 130.

The plurality of beads 130 has a diameter d which is larger than the thickness t of the electroactive layer 120. Further, the beads 130 are dispersed in the electroactive layer 120 so that at least one surface of the electroactive layer 120 may be convex along the surfaces of the plurality of beads 130. The beads 130 are dispersed in a solution including an electroactive polymer and are applied on the first electrode 110 together with the solution including the electroactive polymer. Specifically, the first electrode 110 is formed on a substrate configured by glass and the solution in which the beads 130 and the electroactive polymer are dispersed are applied on the first electrode 110. The solution in which the beads 130 and the electroactive polymer are dispersed may be formed by dispersing an electroactive polymer material such as a powder type PVDF-TrFE, PVDF-TrFE-CFE or PVDF-TrFE-CTFE in a solvent such as methyl ethyl ketone (MEK) or cyclopentanone and dispersing the beads 130. The solution in which the beads 130 and the electroactive polymer are dispersed is applied on a substrate on which the first electrode 110 is formed to have a thickness t which is smaller than the diameter d of the beads 130. Thereafter, the solvent is removed by an annealing process, an electroactive layer 120 illustrated in FIG. 2 is formed. In the meantime, the solution containing the electroactive polymer covers surfaces of the beads 130 by a surface tension between the solution containing the electroactive polymer and the beads 130 and when the solvent is removed by the annealing process, a layer formed of the electroactive polymer covers the surfaces of the beads 130 with a thin thickness. Accordingly, one surface of the electroactive layer 120 is formed to be convex along the surfaces of the beads 130. Thereafter, the second electrode 140 is formed. The second electrode 140 is formed to be convex along one surface of the convex electroactive layer 120.

The plurality of beads 130 has a higher Young's modulus than the electroactive polymer which configures the electroactive layer 120. That is, the plurality of beads 130 is formed of an organic material or an inorganic material having a higher Young's modulus than the PVDF copolymer or the PVDF terpolymer. For example, when the beads 130 are formed of an organic material, each of the beads 130 may be formed of any one selected from divinylbenzene (DVB), polystyrene, a PVDF based polymer, and acrylic polymer. Further, when the beads 130 are formed of an inorganic material, each of the beads 130 may be formed of silicon.

The touch sensitive element 100 according to an exemplary embodiment of the present disclosure includes beads 130 which are dispersed in the electroactive layer 120 and have a diameter d larger than the thickness t of the electroactive layer 120. Therefore, the surface area of the electroactive layer 120 may be increased and the blocking force of the touch sensitive element 100 may be increased. Here, the blocking force refers to a maximum force which may be generated by vibrating the touch sensitive element 100 and satisfies the relationship of Equation 1.

$$F \propto N\left(\frac{S}{L}\right)Y d_{33} V \qquad \text{[Equation 1]}$$

Here, F is a magnitude of the blocking force, N is a number of laminated electroactive layers 120, S is a surface area of the electroactive layer 120, L is a thickness of the electroactive layer 120, $d_{33}$ is a piezoelectric coefficient of the electroactive layer 120, Y is a Young's modulus of the electroactive layer 120, and V is an intensity of a voltage applied to the electroactive layer 120.

The larger the blocking force of the touch sensitive element 100, the larger the vibration generated by the touch sensitive element 100. Even though a structure having a large mass is disposed on the touch sensitive element 100, the touch sensitive element 100 may overcome a load of an upper structure due to gravity with sufficient force. Therefore, the touch sensitive element 100 may vibrate the upper structure and the vibration of the touch sensitive element 100 may be transmitted through the upper structure.

As mentioned above, the touch sensitive element 100 according to the exemplary embodiment of the present disclosure includes a plurality of beads 130 having a diameter d larger than the thickness t of the electroactive layer 120. Therefore, at least one surface of the electroactive layer 120 is formed to be convex along the surface of the beads 130. Therefore, the surface of the electroactive layer 120 may be formed to be concave and convex and the surface area of the electroactive layer 120 may be increased. As seen from Equation 1, the blocking force of the touch sensitive element 100 is proportional to the surface area of the electroactive layer 120. As the blocking force of the touch sensitive element 100 is improved, the vibration strength of the touch sensitive element 100 is improved and an intensity of the voltage to be applied to the electroactive layer 120 to form a tactile feedback with the same vibration strength, that is, the driving voltage may be reduced.

Further, the touch sensitive element 100 according to the exemplary embodiment of the present disclosure includes beads 130 having a Young's modulus larger than the Young's modulus of the electroactive polymer which configures the electroactive layer 120. Therefore, the overall Young's modulus of the electroactive layer 120 may be increased. As seen from Equation 1, since the blocking force of the touch sensitive element 100 is proportional to the Young's modulus of the electroactive layer 120, the increase of the Young's modulus of the electroactive layer 120 by the beads 130 increases the blocking force of the touch sensitive element 100. Accordingly, the vibration strength of the touch sensitive element 100 may be further improved. Improvement of the vibration strength of the touch sensitive element 100 by the beads 130 will be described with reference to FIG. 3.

Figure 3:
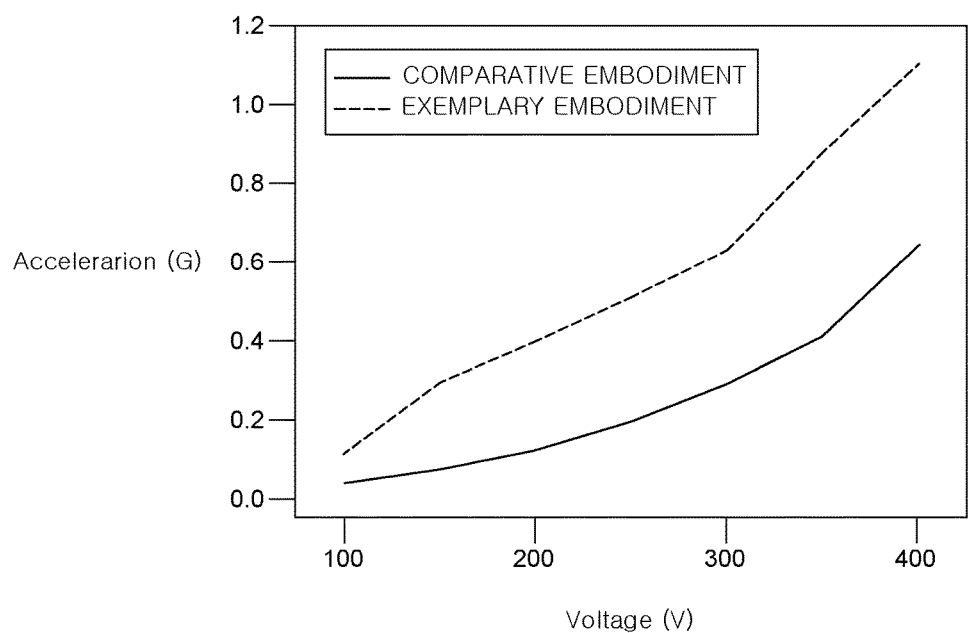
FIG. 3 is a graph for explaining an improved vibration strength of a touch sensitive element according to an exemplary embodiment of the present disclosure.

FIG. 3 is a graph for explaining an improved vibration strength of a touch sensitive element according to an exemplary embodiment of the present disclosure.

FIG. 3 represents vibration accelerations of a touch sensitive element 100 according to a comparative embodiment which does not include a plurality of beads 130 and a touch sensitive element 100 according to an exemplary embodiment of the present disclosure which includes the plurality of beads 130. The touch sensitive element 110 according to the comparative embodiment and the touch sensitive element 100 according to the exemplary embodiment have the same configuration except whether the beads 130 are dispersed in the electroactive layer 120. Specifically, both the touch sensitive element 100 according to the comparative embodiment and the touch sensitive element 100 according to the exemplary embodiment include a first electrode 110, an electroactive layer 120, and a second electrode 140. The first electrode 110 and the second electrode 140 are formed with a thickness of 300 nm using ITO. The electroactive layer 120 is formed using PVDF-TrFE-CFE to have a thickness t of 20 μm. Both the touch sensitive element according to the comparative embodiment and the touch sensitive element 100 according to the exemplary embodiment are formed to have a square shape having a size of 10 cm×10 cm. The graph of FIG. 3 is measured by applying an AC voltage with a frequency of 100 Hz to the touch sensitive element according to the comparative embodiment and the touch sensitive element 100 according to the exemplary embodiment while varying the intensity of the AC voltage.

The beads 130 of the touch sensitive element 100 according to the exemplary embodiment is formed using a PVDF homopolymer to have a spherical shape with a diameter d of 50 μm and the beads 130 are uniformly dispersed in the solution containing PVDF-TrFE-CFE. A total weight of the beads 130 is 20 wt % with respect to the total weight of PVDF-TrFE-CFE. The electroactive layer 120 according to the exemplary embodiment is formed by applying a PVDF-TrFE-CFE solution in which beads 130 are dispersed on the substrate, primarily annealing the solution at a temperature of 70° C. for 10 minutes, and then secondarily annealing the solution at a temperature of 100° C. for 60 minutes.

In contrast, the electroactive layer according to the comparative embodiment is formed by applying a PVDF-TrFE-CFE solution in which beads are not dispersed on the substrate, primarily annealing the solution at a temperature of 70° C. for 10 minutes, and then secondarily annealing the solution at a temperature of 100° C. for 60 minutes.

Referring to FIG. 3, it is confirmed that the touch sensitive element 100 according to the exemplary embodiment which includes the beads 130 has an excellent vibration acceleration G at the same driving voltage as compared with the touch sensitive element according to the comparative embodiment which does not include beads. For example, when a driving voltage of 400 V is applied to both ends of the first electrode 110 and the second electrode 140, the touch sensitive element 100 according to the comparative embodiment vibrates with a vibration acceleration of approximately 0.6 G but the touch sensitive element 100 according to the exemplary embodiment vibrates with a vibration acceleration of approximately 1.15 G. That is, it is confirmed that the vibration acceleration of the touch sensitive element 100 according to the exemplary embodiment which includes the beads 130 is approximately two times improved as compared with the touch sensitive element according to the comparative embodiment which does not include the beads 130.

As mentioned above, since the beads 130 have a diameter d larger than the thickness t of the electroactive layer 120, at least one surface of the electroactive layer 120 may be formed to be convex along the surface of the beads 130 and thus the surface area of the electroactive layer 120 may be increased. As the surface area of the electroactive layer 120 is increased, the blocking force of the touch sensitive element 100 including the electroactive layer 120 is increased and the vibration acceleration of the electroactive layer 120 is improved.

Further, the beads 130 is formed using the PVDF homopolymer having a Young's modulus which is larger than the Young's modulus of PVDF-TrFE-CFE which configures the electroactive layer 120 so that the overall Young's modulus of the electroactive layer 120 may be increased. Therefore, the blocking force of the touch sensitive element 100 is increased and the vibration acceleration of the touch sensitive element 100 may be further improved.

In the meantime, the touch sensitive element 100 according to the exemplary embodiment of FIG. 3 includes beads 130 which have a diameter d larger than the thickness t of the electroactive layer 120 and a Young's modulus higher than a Young's modulus of PVDF-TrFE-CFE which is an electroactive polymer configuring the electroactive layer 120. The vibration acceleration of the touch sensitive element 100 may be improved only using the beads 130 having a diameter d larger than the thickness t of the electroactive layer 120. That is, even though the Young's modulus of the beads 130 is equal to or lower than that of PVDF-TrFE-CFE, the increase of the surface area of the electroactive layer 120 by the diameter d of the beads 130 may improve the blocking force of the touch sensitive element 100 so that the vibration acceleration of the touch sensitive element 100 may be improved.

Similarly, even though the diameter d of the beads 130 is equal to or smaller than the thickness t of the electroactive layer 120, when the Young's modulus of the beads 130 is higher than that of PVDF-TrFE-CFE which configures the electroactive layer 120, the overall Young's modulus of the electroactive layer 120 may be improved by the beads 130, so that the vibration acceleration of the touch sensitive element 100 may be improved.

As a result, there is no need to satisfy both the condition of the diameter d of the beads 130 with respect to the thickness t of the electroactive layer 120 and the condition of the Young's modulus of the beads 130. In other words, even though only one of two conditions is satisfied, the vibration acceleration of the touch sensitive element 100 may be improved.

In the meantime, each of the beads 130 may have a diameter d appropriate to increase the surface area of the electroactive layer 120. Specifically, the beads 130 have diameters d which are 1.5 to 2 times larger than the thickness t of the electroactive layer 120. When the diameter d of the beads 130 is less than 1.5 times the thickness t of the electroactive layer 120, the increase of the surface area of the electroactive layer 120 by the beads 130 may be very small and the blocking force of the touch sensitive element 100 may not be substantially increased. Further, when the diameter d of the beads 130 exceeds two times the thickness t of the electroactive layer 120, an occupation rate of the beads 130 which does not have a piezoelectric characteristic to the electroactive layer 120 is increased. Accordingly, the occupation rate of the electroactive polymer having a piezoelectric characteristic is relatively reduced as compared with the beads 130. Therefore, the piezoelectric characteristic of the electroactive layer 120 is reduced and the vibration strength of the touch sensitive element 100 may be reduced. Further, when the diameter d of the beads 130 exceeds two times the thickness t of the electroactive layer 120, surfaces of the beads 130 may excessively protrude from the surface of the electroactive layer 120. Furthermore, the solution containing the electroactive polymer may not cover the surfaces of the beads 130. Therefore, the surfaces of the beads 130 are exposed to the outside and the exposed surfaces of the beads 130 may serve as defects which do not generate the vibration. Accordingly, the vibration strength of the touch sensitive element 100 may be rather reduced.

Even though the plurality of beads 130 having the same diameter d is illustrated in FIG. 2, in some exemplary embodiments, diameters d of the beads 130 may be different from each other. For example, the diameters d of the beads 130 may have various values within the range which is 1.5 to 2 times larger than the thickness t of the electroactive layer 120.

The change of the vibration strength of the touch sensitive element 100 according to the diameter d of the beads 130 will be described with reference to FIG. 4.

Figure 4:
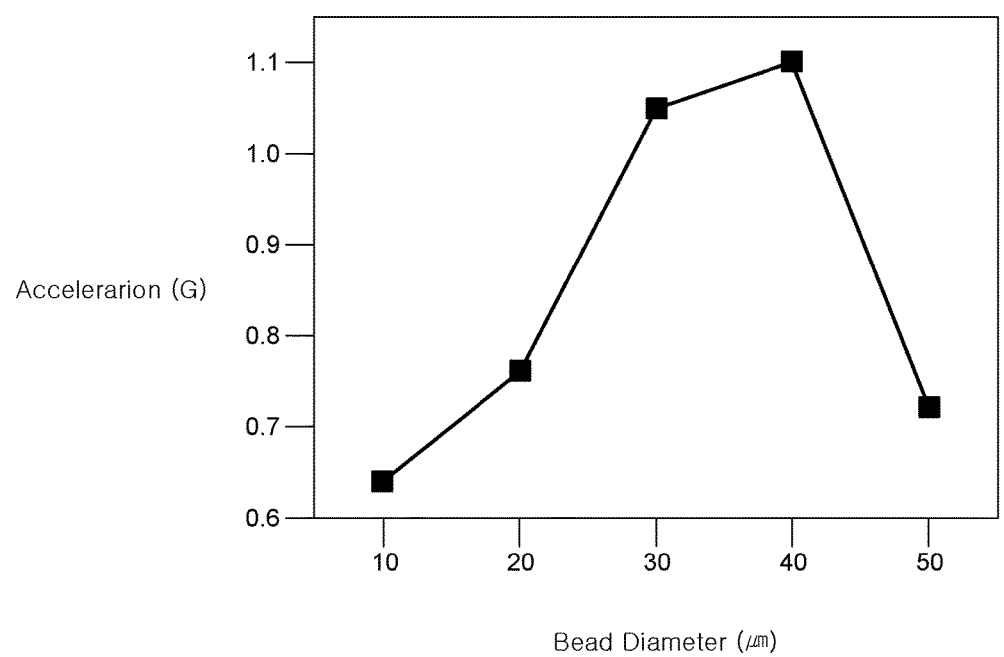
FIG. 4 is a graph for explaining a vibration strength of a touch sensitive element according to an exemplary embodiment of the present disclosure according to a diameter of a bead.

FIG. 4 is a graph for explaining a vibration strength of a touch sensitive element according to an exemplary embodiment of the present disclosure according to a diameter of a bead. The graph of FIG. 4 is measured using a touch sensitive element 100 having the same configuration as the touch sensitive element 100 according to the exemplary embodiment of FIG. 3 except for the diameter d of the beads 130. That is, the graph of FIG. 4 is measured using a touch sensitive element 100 including the electroactive layer 120 with a thickness of 20 µm and beads 130 dispersed in the electroactive layer 120 at a weight ratio of 20 wt % with respect to a total weight of the PVDF-TrFE-CFE which configures the electroactive layer 120.

Referring to FIG. 4, it is understood that as the diameter d of the beads 130 is increased, the vibration acceleration of the touch sensitive element 100 according to the exemplary embodiment of the present disclosure is increased. For example, when the diameter d of the beads 130 is 30 µm or larger, the diameter d of the beads 130 is 1.5 times larger than the thickness t of the electroactive layer 120 which is 20 µm. When the diameter d of the beads 130 is 20 µm, the vibration acceleration of the touch sensitive element 100 is approximately 0.75 G and when the diameter d of the beads 130 is 30 µm, the vibration acceleration of the touch sensitive element 100 is improved to be approximately 1.05 G. That is, when the diameter d of the beads 130 is 1.5 times or larger than the thickness t of the electroactive layer 120, the vibration acceleration of the touch sensitive element 100 is significantly improved. In contrast, when the diameter d of the beads 130 exceeds two times the thickness t of the electroactive layer 120, that is, the diameter d of the beads 130 exceeds 40 µm in the graph of FIG. 4, the vibration acceleration of the touch sensitive element 100 is reduced. As mentioned above, when the diameters d of the beads 130 are increased, the occupation ratio of the beads 130 which do not have piezoelectric characteristic to the electroactive layer 130 is increased and the occupation ratio of the electroactive polymer having a piezoelectric characteristic to the electroactive layer 130 is reduced. Therefore, the vibration acceleration of the touch sensitive element 100 may be lowered. That is, when the diameter d of the beads 130 is 1.5 to 2 times the thickness t of the electroactive layer 120, the vibration acceleration of the touch sensitive element 100 may be maximized.

Further, in order to sufficiently improve the blocking force of the touch sensitive element 100, the beads 130 have a Young's modulus which is two times or higher than the Young's modulus of the electroactive polymer which configures the electroactive layer 120. When the Young's modulus of the beads 130 is smaller than two times the Young's modulus of the electroactive polymer, the improvement of the Young's modulus of the electroactive layer 120 by the beads 130 may be very small. Therefore, the blocking force of the touch sensitive element 100 may not be sufficiently improved. This will be described in more detail with reference to FIG. 5.

Figure 5:
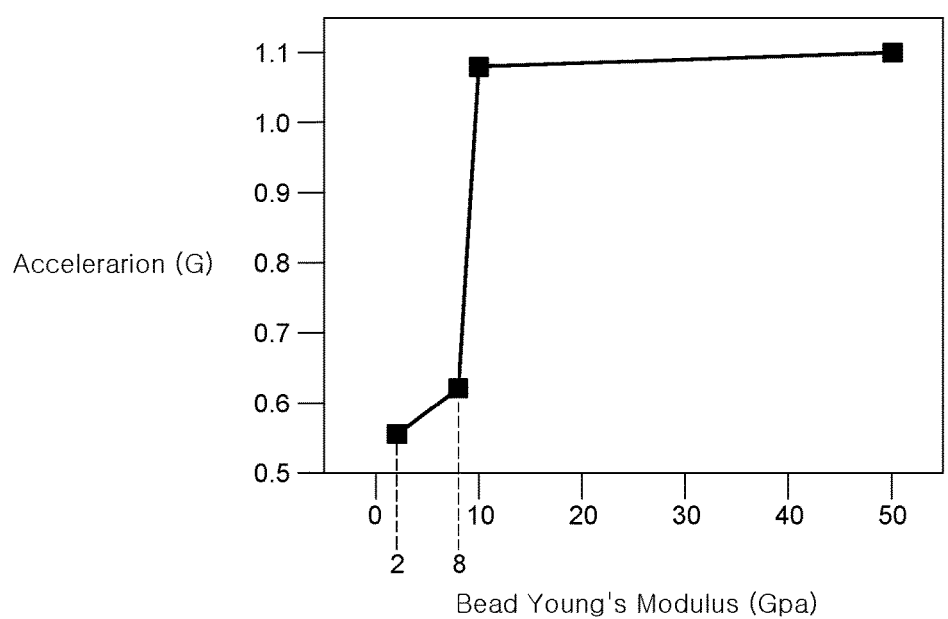
FIG. 5 is a graph for explaining a vibration strength of a touch sensitive element according to an exemplary embodiment of the present disclosure according to a Young's modulus of a bead.

FIG. 5 is a graph for explaining a vibration strength of a touch sensitive element according to an exemplary embodiment of the present disclosure according to a Young's modulus of a bead. The graph of FIG. 5 is measured using a touch sensitive element 100 having the same configuration as the touch sensitive element 100 according to the exemplary embodiment of FIG. 3 except for the Young's modulus d of the beads 130. That is, the graph of FIG. 5 is measured using a touch sensitive element 100 including an electroactive layer 120 formed of PVDF-TrFE-CFE which has a thickness of 20 μm and a Young's modulus of 2 Gpa.

Referring to FIG. 5, it is understood that when the Young's modulus of the beads 130 is approximately two times or higher than the Young's modulus of the electroactive polymer which configures the electroactive layer 120, the vibration acceleration of the touch sensitive element 100 is improved. For example, it is understood that when the Young's modulus of the beads 130 is 2 Gpa, the vibration acceleration of the touch sensitive element 100 is approximately 0.55 G and when the Young's modulus of the beads 130 is 8 Gpa, the vibration acceleration of the touch sensitive element 100 is increased to approximately 1.05 G. In this case, as mentioned above, the beads 130 may be formed of an organic material including any one selected from DVB, polystyrene, a PVDF based polymer, and acrylic-based polymer or an inorganic material including silicon so that the Young's modulus is higher than the Young's modulus of the electroactive polymer.

In the meantime, the beads 130 may be dispersed in the electroactive layer 120 at an appropriate content to maximize the vibration strength of the touch sensitive element 100. For example, the beads 130 may be dispersed at 10 wt % to 20 wt % with respect to a total weight of the electroactive polymer which configures the electroactive layer 120. When the weight ratio of the beads 130 is lower than 10 wt %, the increase of the surface area of the electroactive layer 120 by the beads 130 or the increase in the Young's modulus of the electroactive layer 120 by the beads 130 may be very small. Further, the increase of the blocking force of the touch sensitive element 100 by the beads 130 may hardly affect the improvement of the vibration strength of the touch sensitive element 100. Further, when the weight ratio of the beads 130 exceeds 20 wt %, the beads 130 may rather reduce the vibration of the electroactive layer 120. As mentioned above, the beads 130 may be formed of an organic material including any one selected from DVB, polystyrene, a PVDF based polymer, and acrylic-based polymer or an inorganic material including silicon which do not have the piezoelectric characteristic. When the weight ratio of the beads 130 exceeds 20 wt %, the content of the electroactive polymer may be relatively reduced as compared with the beads 130. By doing this, the vibration of the electroactive polymer may be reduced and the vibration acceleration of the touch sensitive element 100 may be lowered. Further, when the content of the beads 130 is increased, the beads 130 are aggregated with each other to be provided as a lump in the electroactive layer 120. In this case, in the region where the beads 130 are aggregated, the vibration is not generated so that the overall vibration acceleration of the touch sensitive element 100 may be reduced. Change in the vibration acceleration of the touch sensitive element 100 according to the content of the beads 130 will be described with reference to FIG. 6.

Figure 6:
FIG. 6 is a graph for explaining a vibration strength of a touch sensitive element according to an exemplary embodiment of the present disclosure according to a content of a bead.

FIG. 6 is a graph for explaining a vibration strength of a touch sensitive element according to an exemplary embodiment of the present disclosure according to a content of a bead. The graph of FIG. 6 is measured using a touch sensitive element 100 having the same configuration as the touch sensitive element 100 according to the exemplary embodiment of FIG. 3 except for the contents of the beads 130. Specifically, the graph of FIG. 6 is measured using a touch sensitive element 100 including an electroactive layer 120 which is formed of PVDF-TrFE-CFE and has a thickness of 20 μm and spherical beads 130 having a diameter d of 50 μm.

Referring to FIG. 6, it is confirmed that when the weight ratio of the beads 130 is 10 wt % or higher with respect to the total weight of PVDF-TrFE-CFE which configures the electroactive layer 120, the vibration acceleration is significantly improved. For example, it is understood that when the weight ratio of the beads 130 is 5 wt %, the vibration acceleration of the touch sensitive element 100 is approximately 0.75 G and when the weight ratio of the beads 130 is 10 wt %, the vibration acceleration of the touch sensitive element 100 is increased to approximately 1.0 G. In contrast, it is understood that when the weight ratio of the beads 130 exceeds 20 wt %, the vibration of the electroactive layer 120 is interrupted by the beads 130 so that the vibration acceleration of the touch sensitive element 100 is significantly lowered. Accordingly, the weight ratio of the beads 130 may be desirably 10 wt % to 20 wt % with respect to the total weight of the electroactive polymer of the electroactive layer 120.

Figure 7:
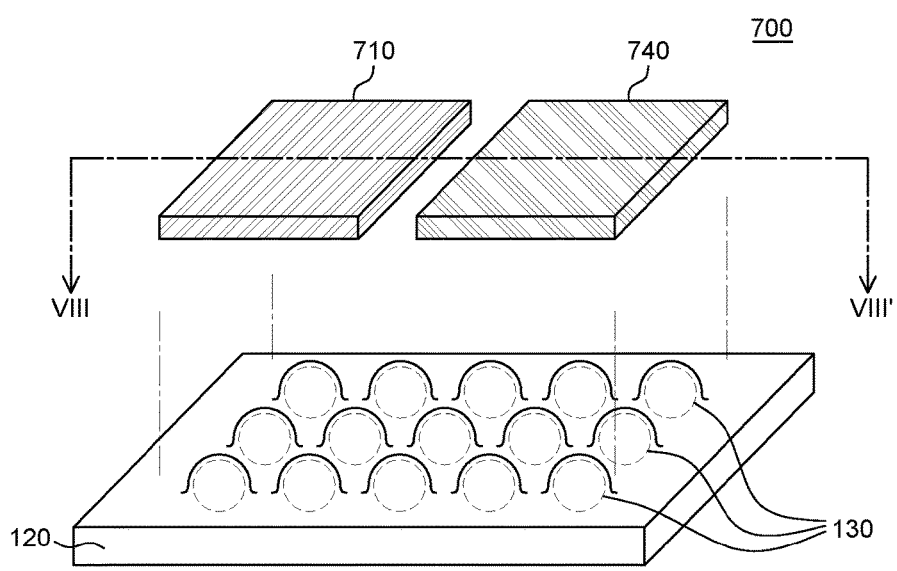
FIG. 7 is an exploded perspective view of a touch sensitive element according to another exemplary embodiment of the present disclosure.
Figure 8:
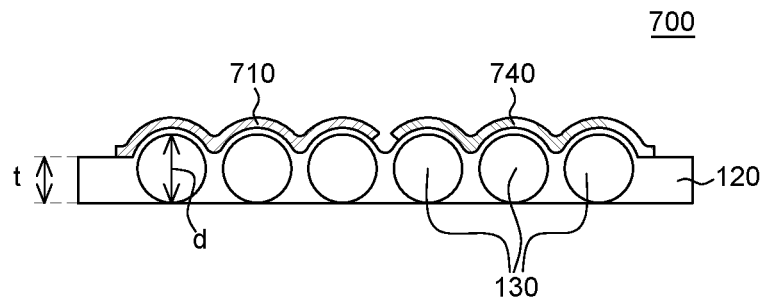
FIG. 8 is a cross-sectional view taken along the line VIII-VIII' of FIG. 7 according to an exemplary embodiment of the present disclosure.

FIG. 7 is an exploded perspective view of a touch sensitive element according to another exemplary embodiment of the present disclosure. FIG. 8 is a cross-sectional view taken along the line VIII-VIII' of FIG. 7 according to one exemplary embodiment of the present disclosure. A touch sensitive element 700 illustrated in FIGS. 7 and 8 is the same as the touch sensitive element 100 illustrated in FIGS. 1 and 2 except that a first electrode 710 and a second electrode 740 are disposed on the same surface of the electroactive layer 120. Therefore, a redundant description will be omitted.

Referring to FIGS. 7 and 8, the first electrode 710 and the second electrode 740 are disposed on the same surface of the electroactive layer 120. In this case, a horizontal electric field may be generated between the first electrode 710 and the second electrode 740 based on a potential difference between the first electrode 710 and the second electrode 740. The electroactive layer 120 may vibrate based on the horizontal electric field between the first electrode 710 and the second electrode 740.

A touch sensitive element 700 according to another exemplary embodiment of the present disclosure includes the first electrode 710 and the second electrode 740 formed on the same surface of the electroactive layer 120. Therefore, the touch sensitive element 700 may provide excellent visibility. When the touch sensitive element 700 is disposed above the display panel which displays an image, the visibility of the display panel may be lowered due to the touch sensitive element 700. Specifically, the first electrode 710 and the second electrode 740 may be formed of a transparent conductive material. Even though the first electrode 710 and the second electrode 740 are formed of a transparent conductive material, a part of light which is incident onto the first electrode 710 and the second electrode 740 may be reflected or absorbed by the first electrode 710 and the second electrode 740. Therefore, since there is light which does not pass through the first electrode 710 and the second electrode 740 among the light which is incident onto the first electrode 710 and the second electrode 740, the light transmittance of the touch sensitive element 700 may be lowered due to the first electrode 710 and the second electrode 740. Specifically, when the first electrode 710 and the second electrode 740 are disposed on both surfaces of the electroactive layer 120, the light transmittance may be further lowered due to the first electrode 710 and the second electrode 740. However, in the touch sensitive element 700 according to the exemplary embodiment of the present disclosure, the first electrode 710 and the second electrode 740 formed of a transparent conductive material are disposed on one surface of the electroactive layer 120. Therefore, the number of electrodes through which the light incident onto the touch sensitive element 700 passes is reduced, so that the transmittance of the touch sensitive element 700 may be improved as compared with the case when the first electrode 710 and the second electrode 740 are disposed on different surfaces of the electroactive layer 120.

In the meantime, the electroactive layer 120 which is disposed below the first electrode 710 and the second electrode 740 includes a convex surface along the surfaces of the beads 130 dispersed therein. Therefore, the surface area of the electroactive layer 120 is increased due to the beads 130 and the blocking force of the touch sensitive element 700 is increased.

Further, the beads 130 have a Young's modulus higher than the Young's modulus of the electroactive polymer which configures the electroactive layer 120. Therefore, the overall Young's modulus of the electroactive layer 120 is increased and the blocking force of the touch sensitive element 700 may be increased.

As the blocking force of the touch sensitive element 700 is increased, the vibration strength of the touch sensitive element 700 is increased. Therefore, even though a heavy structure is disposed above the touch sensitive element 700, the touch sensitive element 700 may vibrate the structure by a large force and the vibration of the touch sensitive element 700 may be transmitted through the structure.

Figure 9:
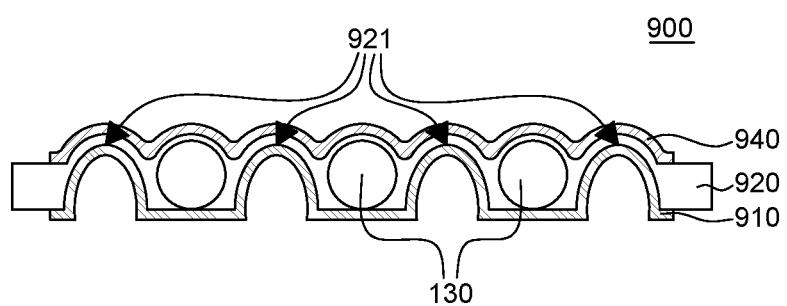
FIG. 9 is a cross-sectional view of a touch sensitive element according to another exemplary embodiment of the present disclosure.

FIG. 9 is a cross-sectional view of a touch sensitive element according to another exemplary embodiment of the present disclosure. A touch sensitive element 900 illustrated in FIG. 9 is the same as the touch sensitive element 100 illustrated in FIGS. 1 and 2 except that an electroactive layer 920 includes a protrusion 921 protruding between the plurality of beads 130. Therefore, a redundant description will be omitted.

Referring to FIG. 9, the electroactive layer 920 includes a plurality of protrusions 921. The protrusions 921 are located between regions where the plurality of beads 130 is disposed and have a shape in which a lower surface and an upper surface of the electroactive layer 920 upwardly protrude. Therefore, the upper surface of the electroactive layer 920 is convex in regions corresponding to the plurality of protrusions 921 and the plurality of beads 130 and the surface area of the electroactive layer 920 is increased.

The protrusions 921 of the electroactive layer 920 are formed using a substrate having protruding patterns corresponding to the protrusions 921. Specifically, the first electrode 910 is formed on a substrate having a plurality of protruding patterns. A first electrode 910 is formed to cover the upper surface of the substrate so that as illustrated in FIG. 9 so that the first electrode 910 is formed to be bent along the protruding patterns of the substrate.

Thereafter, the electroactive layer 920 is formed on the first electrode 910. As mentioned above, the electroactive layer 920 is formed by dispersing the electroactive polymer in a solvent, dispersing the plurality of beads 130 in a solution containing the electroactive polymer, applying the solution in which the beads 130 and the electroactive polymer are dispersed on the first electrode 910, and then removing the solvent by an annealing process. When a thickness of the protruding pattern of the first electrode 910 is larger than the thickness of the applied solution and the diameters of the beads 130 are larger than the thickness of the applied solution, the solution may thinly cover the surface of the protruding pattern of the first electrode 910 and the surface of the beads 130 by a surface tension of the first electrodes 910 and the surface tension of the beads 130. Further, when the solvent is removed by the annealing process, as illustrated in FIG. 9, the electroactive layer 920 having a concave and convex surface may be formed.

Thereafter, a second electrode 940 is formed on the electroactive layer 920. The second electrode 940 is formed to cover the upper surface of the electroactive layer 920 so that the second electrode may be formed to be bent along the upper surface of the electroactive layer 920. Thereafter, a substrate having a plurality of protruding patterns is removed. As the substrate is removed, a touch sensitive element 900 has the first electrode 910 which is bent in a region corresponding to the protrusion 921, the electroactive layer 920 having a protruding upper surface in the region corresponding to the protrusions 921 and the beads 130, and the second electrode 940 which is bent along the surfaces of the protrusions 921 and the beads 130 is produced.

A touch sensitive element 900 according to another exemplary embodiment of the present disclosure includes an electroactive layer 920 including a plurality of protrusions 921 and a plurality of beads 130 having a diameter larger than the thickness of the electroactive layer 920. Therefore, at least one surface of the electroactive layer 920 is convex along the surfaces of the protrusions 921 and the beads 130 and the surface area of the electroactive layer 920 is increased due to the protrusions 921 and the beads 130. Accordingly, the blocking force of the touch sensitive element 900 is increased and the touch strength of the touch sensitive element 900 is improved.

Figure 10:
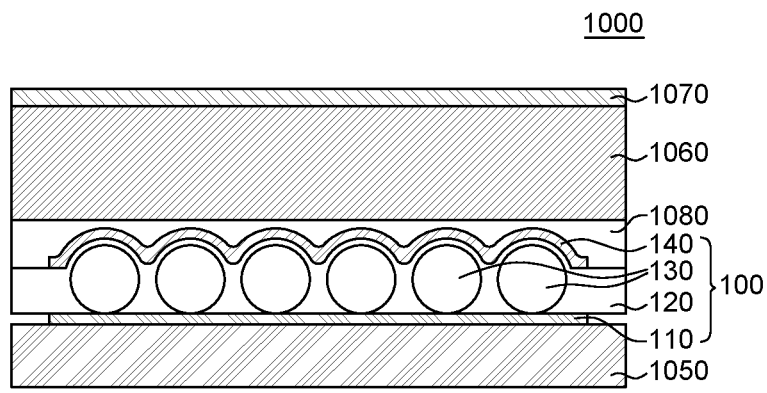
FIG. 10 is a cross-sectional view of a display device according to an exemplary embodiment of the present disclosure.

FIG. 10 is a cross-sectional view of a display device according to an exemplary embodiment of the present disclosure. The touch sensitive element 100 included in the display device 1000 of FIG. 10 is the same as the touch sensitive element 100 according to the exemplary embodiment of the present disclosure which has been described with reference to FIGS. 1 and 2. Therefore, a redundant description of the touch sensitive element 100 will be omitted.

Referring to FIG. 10, a display device 1000 includes a display panel 1060, a touch sensitive element 100, a touch element 1070, a structure 1050, and an adhesive member 1080. In FIG. 10, specific illustration of the components of the touch element 1070, the display panel 1060 and the structure 1050 will be omitted.

The display panel 1060 refers to a panel in which a display element for displaying an image in the display device 1000 is disposed. As the display panel 1060, for example, various display panels such as an organic light emitting display panel, a liquid crystal display panel, and an electro phoretic may be used.

The touch element 1070 refers to a panel which senses a user's touch input to the display device 1000. As the touch panel 1070, for example, a capacitive type, a resistive type, a surface ultrasonic wave type, or an infrared ray type may be used, but a capacitive type touch element may be used as the touch element 1070. In this case, a user may directly apply a touch input onto a screen of the display panel 1060 by means of the touch element 1070 disposed on the display panel 1060, so that manipulation of the display device 1000 may be more easily performed. Further, the touch sensitive element 100 may provide a tactile feedback corresponding to the user's touch input. Therefore, the user may simultaneously receive not only visual information but also tactile information through the display device 1000.

The structure 1050 is disposed below the touch sensitive element 100 and may include various components according to the type of display panel 1060. For example, when the display panel 1060 is a liquid crystal display panel including liquid crystal, the structure 1050 may include a backlight unit which provides light to the display panel 1060. Further, when the display panel 1060 is an organic light emitting display panel including an organic light emitting diode, the structure 1050 may include any one of a heat radiating sheet, a pressure sensor, and a back cover. The heat radiating sheet is a sheet which externally discharges heat generated from the components disposed on the structure 1050 and may be formed of a metal having excellent thermal conductivity. The pressure sensor is a sensor which may measure an intensity of a user's touch input and may be implemented as a capacitance type. For example, the pressure sensor may be configured of two opposing electrodes and an elastic insulating member disposed between two electrodes. An interval between two electrodes changes in accordance with the user's touch input so that the capacitance change generated thereby is measured to measure an intensity of a touch pressure. The back cover is a member which protects lower portions of the display panel 1060 and the touch sensitive element 100 and is formed of metal or plastic.

The touch sensitive element 100 is disposed below the display panel 1060 and includes a first electrode 110, an electroactive layer 120, a plurality of beads 130, and a second electrode 140. The beads 130 have a diameter larger than a thickness of the electroactive layer 120 and one surface of the electroactive layer 120 has a convex shape along the surfaces of the beads 130. Therefore, the surface area of the electroactive layer 120 is increased and the blocking force of the touch sensitive element 100 is increased. As the blocking force of the touch sensitive element 100 is increased, the touch sensitive element 100 may vibrate the display panel 1060 and the touch element 1070 disposed above the touch sensitive element 100 with a large force.

Specifically, the user applies touch input to an upper portion of the touch element 1070 and the vibration of the touch sensitive element 100 needs to be transmitted to the user through the display panel 1060 and the touch element 1070. As mentioned above, the display panel 1060 and the touch element 1070 are disposed above the touch sensitive element 100 so that a load may be applied to the touch sensitive element 100 due to weights of the display panel 1060 and the touch element 1070. When the blocking force of the touch sensitive element 100 is small, the vibration of the touch sensitive element 100 does not overcome the load due to the weight of the display panel 1060 and the touch element 1070 so that the vibration of the touch sensitive element 100 may not be transmitted to the user.

However, the touch sensitive element 100 according to the exemplary embodiment of the present disclosure includes beads 130 having a diameter larger than the thickness of the electroactive layer 120 and the surface area of the electroactive layer 120 is increased due to the beads 130. Therefore, the blocking force of the touch sensitive element 100 is increased. Therefore, the touch sensitive element 100 may vibrate with a large force and the vibration of the touch sensitive element 100 may sufficiently overcome the load due to the weights of the display panel 1060 and the touch element 1070. Accordingly, the touch sensitive element 100 vibrates the display panel 1060 and the touch element 1070 and the vibration of the touch sensitive element 100 may be transmitted to the user through the display panel 1060 and the touch element 1070.

Further, when the Young's modulus of the plurality of beads 130 is higher than the Young's modulus of the electroactive polymer which configures the electroactive layer 120, the overall Young's modulus of the electroactive layer 120 is increased by the beads 130 and the blocking force of the touch sensitive element 100 may be further increased. Therefore, the vibration of the touch sensitive element 100 may be further satisfactorily transmitted to the user through the display panel 1060 and the touch element 1070.

In the meantime, since the touch sensitive element 100 is disposed below the display panel 1060, the interruption of the image implemented in the display panel 1060 due to the touch sensitive element 100 may be minimized. That is, the lowering of visibility due to the touch sensitive element 100 may be minimized. As mentioned above, the first electrode 110, the second electrode 140, and the electroactive layer 120 of the touch sensitive element 100 have small thicknesses and transparency. Nevertheless, a part of light emitted from the display panel 1060 may be reflected or scattered from the surfaces of the first electrode 110, the second electrode 140, and the electroactive layer 120, so that the visibility of the display panel 1060 may be lowered. However, in the display device 1000 according to the exemplary embodiment of the present disclosure, the touch sensitive element 100 is disposed below the display panel 1060 so that the lowering of visibility due to the touch sensitive element 100 may be minimized and the image implemented in the display panel 1060 may be clearly seen.

In the meantime, the touch sensitive element 100 and the display panel 1060 may be adhered to each other by means of the adhesive member 1080. The adhesive member 1080 has a thickness larger than a height of a portion where the second electrode 140 is bent so as to cover the convex surface of the touch sensitive element 100. For example, the adhesive member 1080 has a thickness of 10 μm or larger. In this case, the bent portion of the second electrode 140 is covered by the adhesive member 1080 and the display panel 1060 and the touch sensitive element 100 may be firmly adhered to each other by the adhesive member 1080.

Figure 11:
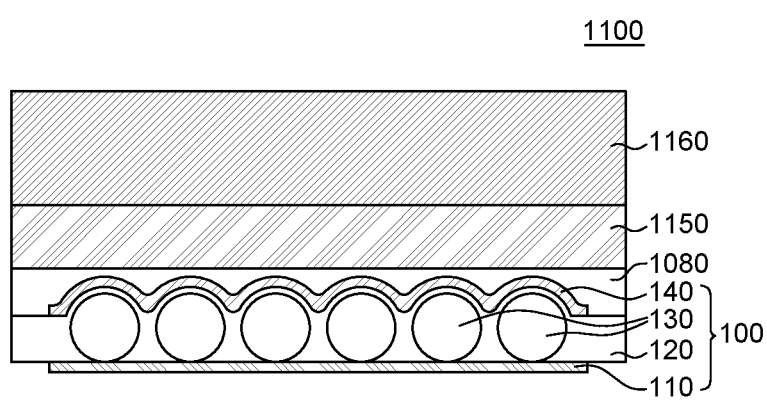
FIG. 11 is a cross-sectional view of a display device according to another exemplary embodiment of the present disclosure.

FIG. 11 is a cross-sectional view of a display device according to another exemplary embodiment of the present disclosure. A display device 1100 of FIG. 11 is the same as the display device 1000 of FIG. 10 except that a touch element is omitted and a structure 1150 is disposed above the touch sensitive element 100 so that a redundant description will be omitted.

Referring to FIG. 11, the display device 1100 according to another exemplary embodiment of the present disclosure includes a touch element integrated display panel 1160 including a plurality of touch electrodes. The touch element integrated display panel 1160 may be a liquid crystal display panel including a plurality of touch electrodes. The touch electrode may serve as a pixel electrode or a common electrode of the liquid crystal display panel. In this case, a common voltage or a pixel voltage is applied to the touch electrode during a display interval when the image is displayed on the display panel 1160, and a touch voltage is applied to the touch electrode during a touch sensing interval when the touch input is sensed. However, the present disclosure is not limited thereto and the display panel 1160 may be an organic light emitting display panel 1160 including a plurality of touch electrodes. In this case, the touch electrode may be disposed below an upper substrate of the organic light emitting display panel 1160 or above an encapsulation layer which encapsulates the organic light emitting diode.

A structure 1150 may be disposed below the display panel 1160 and may include various components according to the type of display panel 1160. For example, when the display panel 1160 is implemented as a touch element integrated liquid crystal display panel 1160, the structure 1150 may include a backlight unit.

In the display device 1100 according to another exemplary embodiment of the present disclosure, since a plurality of touch electrodes is provided on the display panel 1160, a separate touch element may be omitted. Therefore, an entire thickness of the display device 1100 may be reduced and a thin and light display device 1100 may be provided.

Further, the display device 1100 according to another exemplary embodiment of the present disclosure includes a touch sensitive element 100 disposed below the structure 1150, so that the lowering of the visibility due to the touch sensitive element 100 may not be caused. Specifically, when the display panel 1160 is the touch element integrated liquid crystal display panel 1160, the structure 1150 below the display panel 1160 may include a backlight unit. When the touch sensitive element 100 is disposed between the display panel 1160 and the structure 1150, light generated in the backlight unit of the structure 1150 may be reflected or scattered while passing through the touch sensitive element 100. Further, a part of light which is not reflected or scattered by the touch sensitive element 100 may be provided to the display panel 1160. In this case, the brightness of the light of the backlight unit may be reduced by the touch sensitive element 100 and the visibility of the display panel 1160 may be lowered. However, the display device 1100 according to another exemplary embodiment of the present disclosure includes a touch sensitive element 100 disposed below the structure 1150, so that all light of the backlight unit may be transmitted to the display panel 1160 and the lowering of the visibility due to the touch sensitive element 100 may not be caused.

Specifically, the touch sensitive element 100 includes a plurality of beads 130 having a diameter which is larger than the thickness of the electroactive layer 120 so that the surface area of the electroactive layer 120 may be increased. Further, when the Young's modulus of the plurality of beads 130 is higher than the Young's modulus of the electroactive polymer which configures the electroactive layer 120, the entire Young's modulus of the electroactive layer 120 may be increased due to the beads 130. The increase of the surface area of the electroactive layer 120 and the increase of the Young's modulus of the electroactive layer 120 improve the blocking force of the touch sensitive element 100. As the blocking force of the touch sensitive element 100 is improved, the touch sensitive element 100 may vibrate with a large force. Accordingly, even though the display panel 1160 and the structure 1150 are disposed above the touch sensitive element 100, the vibration of the touch sensitive element 100 may be transmitted to the user through the display panel 1160 and the structure 1150.

An improved vibration strength of the display device according to the exemplary embodiment of the present disclosure will be described with reference to FIG. 12.

Figure 12:
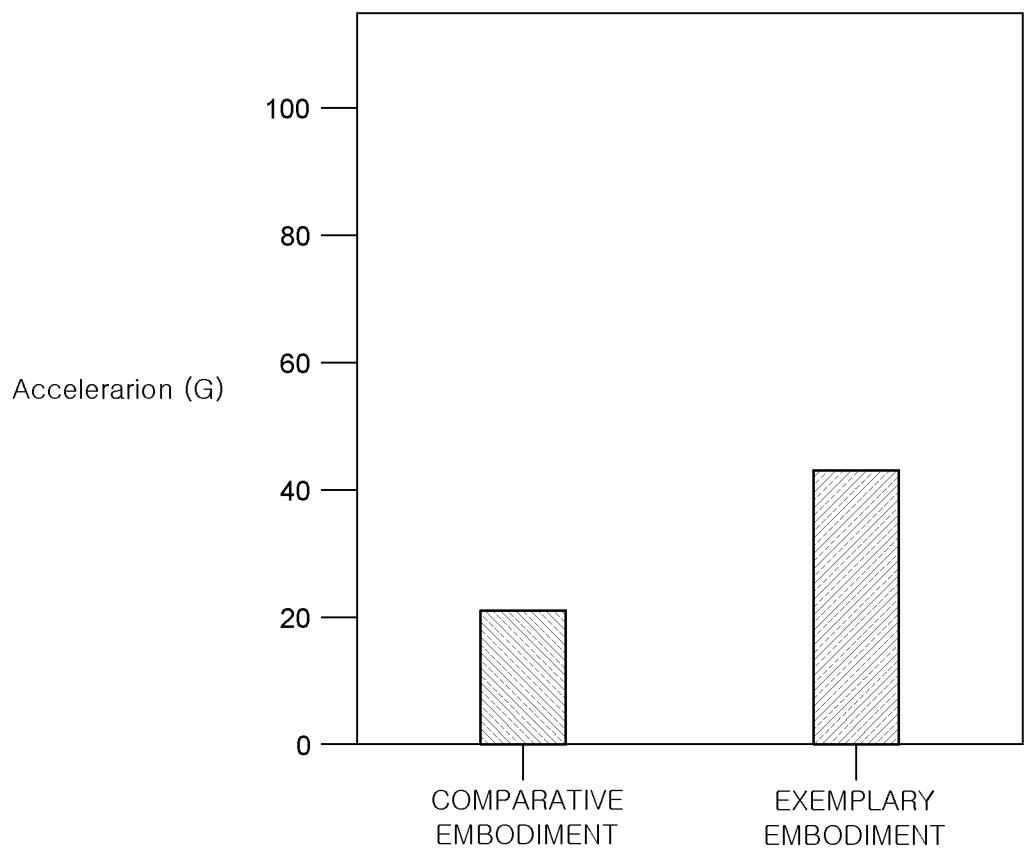
FIG. 12 is a graph for explaining an improved vibration strength of a display device according to an exemplary embodiment of the present disclosure.

FIG. 12 is a graph for explaining an improved vibration strength of a display device according to an exemplary embodiment of the present disclosure.

In FIG. 12, both a display device according to a comparative embodiment and a display device according to the exemplary embodiment include the same configuration except for the touch sensitive element. Specifically, both a display device according to a comparative embodiment and a display device according to the exemplary embodiment include a touch element integrated liquid crystal display panel disposed on the touch sensitive element. A weight of the liquid crystal display panel is 74 g.

In the meantime, both a touch sensitive element of the display device according to a comparative embodiment and a touch sensitive element of the display device according to the exemplary embodiment include a first electrode, an electroactive layer, and a second electrode. The first electrode and the second electrode are formed to have a thickness of 300 nm using ITO. The electroactive layer is formed using PVDF-TrFE-CFE to have a thickness of 20 μm. Both the touch sensitive element according to the comparative embodiment and the touch sensitive element according to the exemplary embodiment are formed to have a square shape having a size of 10 cm×10 cm. A graph of FIG. 12 is measured by applying an AC voltage of 400 V and 100 Hz to the touch sensitive element of the display device according to the comparative embodiment and the touch sensitive element of the display device according to the exemplary embodiment.

The touch sensitive element of the display device according to the exemplary embodiment includes a plurality of spherical beads having a diameter d of 50 μm using a PVDF homopolymer. The beads are uniformly dispersed in a solution containing PVDF-TrFE-CFE and a total weight of the beads is 20 wt % with respect to the total weight of PVDF-TrFE-CFE.

As illustrated in FIG. 12, it is understood that the display device according to the comparative embodiment includes a touch sensitive element which does not include beads, so that the vibration of the touch sensitive element does not sufficiently vibrate the display panel. That is, since the touch sensitive element of the display device according to the comparative embodiment does not include beads, the touch sensitive element has a small blocking force and does not sufficiently vibrate the display panel of 74 g. In contrast, the display device according to the exemplary embodiment includes the touch sensitive element including beads. The beads have a diameter larger than the thickness of the electroactive layer and have a Young's modulus larger than the Young's modulus of the electroactive polymer which configures the electroactive layer. Therefore, the blocking force of the touch sensitive element is increased and the touch sensitive element vibrates with a large force, so that the display panel of 74 g disposed on the touch sensitive element may sufficiently vibrate. As a result, the display device according to the exemplary embodiment has a larger vibration strength than that of the display device according to the comparative embodiment.

The exemplary embodiments of the present disclosure can also be described as follows:

According to an aspect of the present disclosure, the touch sensitive element includes an electroactive layer, an electrode, and a plurality of beads. The electroactive layer includes an electroactive polymer. The electrode is disposed on at least one surface of the electroactive layer. The plurality of beads is dispersed in the electroactive layer and has a diameter larger than a thickness of the electroactive layer. The touch sensitive element according to an exemplary embodiment of the present disclosure includes a plurality of beads having a diameter larger than a thickness of the electroactive layer. Therefore, at least one surface of the electroactive layer is formed to be convex along the surfaces of the plurality of beads and the surface area of the electroactive layer is increased. Accordingly, the blocking force of the touch sensitive element may be improved and the vibration strength of the touch sensitive element may be improved.

The plurality of beads may have a Young's modulus higher than a Young's modulus of the electroactive polymer.

Diameters of the plurality of beads may be 1.5 to 2 times the thickness of the electroactive layer.

A total weight of the plurality of beads is 10 wt % to 20 wt % with respect to a weight of the electroactive polymer.

The electroactive polymer is at least one of poly(vinylidene fluoride-trifluoroethylene) (PVDF-TrFE), poly(vinylidene fluoride-trifluoroethylene-chlorofluoroethylene (PVDF-TrFE-CFE), and poly(vinylidene fluoride-trifluoroethylene-chlorotrifluoroethylene (PVDF-TrFE-CTFE).

The plurality of beads is formed of an organic material including any one selected from divinylbenzene (DVB), polystyrene, a PVDF based polymer, and an acrylic-based polymer or an inorganic material including silicon.

The electroactive layer may include a protrusion protruding in a region between the plurality of beads.

The electrode includes a first electrode and a second electrode. The first electrode may be located on a lower surface of the electroactive layer and may be bent along the lower surface of the electroactive layer in a region corresponding to the protrusion. The second electrode may be located on an upper surface of the electroactive layer and may be bent along the upper surface of the electroactive layer in a region corresponding to the protrusion and a region corresponding to the beads.

According to another aspect of the present disclosure, a touch sensitive element includes an electroactive layer, an electrode, and a plurality of beads. The electroactive layer includes an electroactive polymer. The electrode may be disposed on at least one surface of the electroactive layer. The plurality of beads may be dispersed in the electroactive layer and have a Young's modulus higher than a Young's modulus of the electroactive polymer. The touch sensitive element according to another exemplary embodiment of the present disclosure includes the plurality of beads having a Young's modulus higher than that of the electroactive polymer, so that the entire Young's modulus of the electroactive layer may be improved. Accordingly, the blocking force of the touch sensitive element may be improved and vibration strength of the touch sensitive element may be improved.

Diameters of the plurality of beads are larger than the thickness of the electroactive layer.

The plurality of beads has a Young's modulus which is two times higher than a Young's modulus of the electroactive polymer.

According to an aspect of the present disclosure, a display device includes a display panel and a touch sensitive element. The display panel displays an image. The touch sensitive element is disposed below the display panel and includes an electroactive layer, an electrode, and a plurality of beads. The electrode of the touch sensitive element is disposed on at least one surface of the electroactive layer. The plurality of beads is dispersed in the electroactive layer. At least one surface of the electroactive layer is convex along the plurality of beads. The display device according to an exemplary embodiment of the present disclosure includes a touch sensitive element including an electroactive layer in which at least one surface is convex along the plurality of beads. Therefore, the surface area of the electroactive layer is increased so that the blocking force of the touch sensitive element is improved. As the blocking force of the touch sensitive element is improved, it is possible to overcome the load of the display panel disposed above and vibrate the display panel with high vibration and the vibration of the touch sensitive element may be easily transmitted to the user through the display panel.

Diameters of the plurality of beads are larger than a minimum thickness of the electroactive layer.

The display device may further include a backlight unit disposed below the display panel, the display panel may be a liquid crystal display panel and the touch sensitive element may be disposed below the backlight unit.

The display panel may be an organic light emitting display panel.

The display device may further include a touch element on the display panel.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical spirit of the present disclosure. The scope of the technical spirit of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A touch sensitive element, comprising:
an electroactive layer including an electroactive polymer;
a first electrode on a first surface of the electroactive layer;
a second electrode on a second surface of the electroactive layer that is opposite the first surface, the electroactive layer configured to vibrate responsive to applying a voltage difference between the second electrode and the first electrode; and
a plurality of beads in the electroactive layer,
wherein the electroactive layer includes a protrusion that protrudes from the first surface of the electroactive layer towards the second surface of the electroactive layer such that the protrusion is between at least a pair of beads from the plurality of beads, the protrusion having a hollow portion between the pair of beads.

2. The touch sensitive element of claim 1, wherein a portion of the first electrode positioned in the protrusion comprises a shape corresponding to a shape of the hollow portion of the protrusion.

3. The touch sensitive element of claim 1, wherein the second electrode includes a first portion that overlaps the protrusion and a second portion that overlaps one of the plurality of beads, the first portion of the second electrode having a shape corresponding to the shape of the hollow portion of the protrusion, and the second portion having a shape corresponding to a shape of the one of the plurality of beads.

4. The touch sensitive element of claim 1, wherein the plurality of beads have a diameter that is larger than a thickness of the electroactive layer without the voltage difference being applied between the second electrode and the first electrode.

5. The touch sensitive element of claim 1, wherein the plurality of beads have a Young's modulus that is greater than a Young's modulus of the electroactive polymer.

6. The touch sensitive element of claim 1, wherein a diameter of the plurality of beads is 1.5 to 2 times a thickness of the electroactive layer.

7. The touch sensitive element of claim 1, wherein a total weight of the plurality of beads is 10% to 20% of a weight of the electroactive polymer.

8. The touch sensitive element of claim 1, wherein the electroactive polymer is at least one of poly(vinylidene fluoride-trifluoroethylene) (PVDF-TrFE), poly(vinylidene fluoride-trifluoroethylene-chlorofluoroethylene (PVDF-TrFE-CFE), or poly(vinylidene fluoride-trifluoroethylene-chlorotrifluoroethylene (PVDF-TrFE-CTFE).

9. The touch sensitive element of claim 8, wherein the plurality of beads comprises an organic material including one of divinylbenzene (DVB), polystyrene, a PVDF based polymer, an acrylic based polymer, or an inorganic material including silicon.

10. The touch sensitive element of claim 1, wherein the first surface is below the second surface.

11. A display apparatus, comprising:
a display panel configured to display an image; and
a touch sensitive element on the display panel, the touch sensitive element including:
an electroactive layer;
a first electrode on a first surface of the electroactive layer;
a second electrode on a second surface of the electroactive layer that is opposite the first surface, the electroactive layer configured to vibrate responsive to applying a voltage difference between the second electrode and the first electrode; and
a plurality of beads in the electroactive layer,
wherein the electroactive layer includes a protrusion that protrudes from the first surface of the electroactive layer towards the second surface of the electroactive layer such that the protrusion is between at least a pair of beads from the plurality of beads, the protrusion having a hollow portion between the pair of beads.

12. The display apparatus of claim 11, wherein a portion of the first electrode positioned in the protrusion comprises a shape corresponding to a shape of the hollow portion of the protrusion.

13. The display apparatus of claim 11, wherein the second electrode includes a first portion that overlaps the protrusion and a second portion that overlaps one of the plurality of beads, the first portion of the second electrode having a shape corresponding to the shape of the hollow portion of the protrusion, and the second portion having a shape corresponding to a shape of the one of the plurality of beads.

14. The display apparatus of claim 11, wherein the plurality of beads have a diameter that is larger than a thickness of the electroactive layer without the voltage difference being applied between the second electrode and the first electrode.

15. The display apparatus of claim 11, wherein a diameter of the plurality of beads is larger than a minimum thickness of the electroactive layer.

16. The display apparatus claim 11, further comprising:
a backlight unit below the display panel, wherein the display panel is a liquid crystal display panel, and the touch sensitive element is below the backlight unit.

17. The display apparatus of claim 11, wherein the display panel is an organic light emitting display panel.

18. The display apparatus of claim 11, further comprising:
a touch element on the display panel, wherein the display panel is between the touch element sensitive element and the touch element.

19. The display apparatus of claim 11, wherein the first surface is below the second surface.

* * * * *